Jan. 25, 1949. L. M. STINCHCOMB ET AL 2,460,110
COUPLING MEANS
Filed Oct. 30, 1947

L. M. Stinchcomb
& R. S. Doerr
INVENTORS

BY Roy A. Plant
ATTORNEY

Patented Jan. 25, 1949

2,460,110

UNITED STATES PATENT OFFICE 2,460,110

COUPLING MEANS

Loid M. Stinchcomb and Raymond S. Doerr, Battle Creek, Mich., assignors to H. B. Sherman Manufacturing Company, Battle Creek, Mich., a corporation of Michigan Application October 30, 1947, Serial No. 783,015

2 Claims. (Cl. 285—120)

The present invention relates broadly to connecting devices, and in its specific phases to separable hose couplings.

Conventional hose couplings of the standard threadedly separable type are formed in three parts wherein the female half has a nipple with one end flanged outward, and an extending internally threaded nut which has an inturned end flange engaging the nipple behind its flange. The male half of the coupling is in one piece with one end being in the form of a nipple and the other end enlarged and externally threaded to engage the extending nut. The nipple portion of each half is commonly circumferentially ribbed with one or more ribs for a short distance from its hose receiving end to facilitate fastening a hose on same with a hose clamp, or ferrule. To install each half of this coupling on a piece of hose, the common practice is to slip one half of the coupling onto an extending shouldered mandrel which passes into the coupling member from its large end with the shoulder of the mandrel against the nipple shoulder or flange inside the end of the coupling. The coupling on the mandrel is then forced into the end of the hose until the hose comes up against the enlarged end of the coupling half. A hose clamp, or ferrule, of conventional type is then tightened on the hose over the nipple end of the coupling to anchor them together. This procedure is very satisfactory with the male half of the coupling but causes trouble with the female half for the reason that when the hose is forced up against the end flange of the nut it frictionally holds same against free rotation and makes the tightening of same on a still cock, male coupling member, or the like, difficult without also twisting the hose, a thing which should not be necessary. The tightening of a hose clamp, or ferrule, on the assembly to anchor the hose on the female half of the coupling further aggravates this condition since the tightening of the hose clamp, or ferrule, causes some endwise flowage of the hose which causes the end of the hose to bind still tighter on the end flange of the nut.

The standard present day procedure for producing hose couplings, such as are used on garden hose or the like, is to form them from suitable thin metal tube stock, or to draw them from sheet metal, rather than make them as castings which is no longer economically feasible. In connection with the female half of the coupling, the nipple portion is commonly formed to length with a flanged end, the finished nut slipped into place, and hose gripping corrugations formed on the hose receiving end to complete the assembly, or the nipple may be completed first and a partially finished nut slipped in place and the inturning of its end flange then completed, both constructions being subject, under conditions of use, to the same hose binding trouble described above.

Sometimes it is desired to supply the hose couplings direct to a hose manufacturer with the nipples free from hose gripping corrugations, the latter being formed by a special machine at the time the hose coupling is installed on the hose, such procedure being the subject matter of our copending patent application which is being filed concurrently herewith. This in turn causes difficulty and time consuming delay due to the female nipple and nut assembly readily coming apart before use, if shipped assembled, or requiring assembly on the job if shipped disassembled. It was a recognition of these problems and difficulties, and the shortcomings of the prior art in the thin metal hose coupling field, which led to the conception and development of the present invention.

Accordingly among the objects of the present invention is the provision of a separable hose coupling formed from thin metal, the female half of which is provided with an outturned rib in the nipple portion, close to but spaced from the flanged end thereof, for holding the nut in place therebetween for free rotation.

Another object is to provide a separable, thin metal, hose coupling with either an outwardly rolled or upset rib on the nipple of the female half of same adjacent the flange thereof, with the inturned flange of the assembling nut coming between said rib and flange of said nipple.

Another object is to provide a new method of forming the female half of a hose coupling from thin metal.

A further object is to provide a thin metal hose coupling which is simple in construction, efficient in operation, easy to manufacture as well as install, and readily insertable without a mandrel when free of hose gripping corrugations.

Still further objects and advantages of the present invention will appear as the description proceeds.

To the accomplishment of the foregoing and related ends, the invention, then, consists of the methods and means hereinafter fully described and particularly pointed out in the claims, the annexed drawing and the following description setting forth in detail certain means and modes of carrying out the invention, such disclosed means and modes illustrating, however, but several of the ways in which the principle of the invention may be used.

In the annexed drawing—

Figure 3:
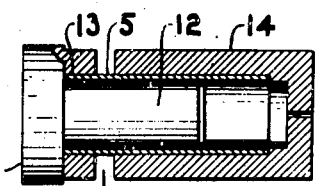

Figure 3 diagrammatically illustrates, in partial section, one form of apparatus usable in upsetting a rib on the nipple of the female half of a hose coupling.

Figure 4:
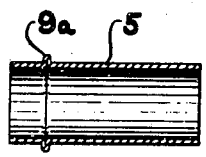

Figure 4 shows a longitudinal section of a nipple with upset rib formed in accordance with the present invention.

Figure 5:
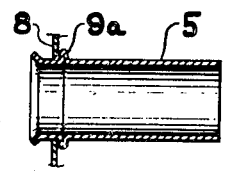

Figure 5 shows a fragmentary longitudinal section of a nipple with the end flange partially turned outward.

Figure 1:
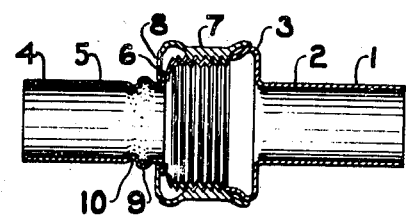
Figure 1 shows a longitudinal section view of a preferred form of the present invention.

Referring more particularly to Figure 1 of the drawing, it will be noted that the male half 1 of the coupling has a round tubular nipple 2 and an expanded and externally threaded end 3. The female half 4 has a round tubular nipple 5 with a flange 6 on its end. Mounted on nipple 5 is an internally threaded nut 7 which has an inturned flange 8 adapted to engage nipple 5 behind flange 6. A rubber washer is normally used within the coupling between flange 6 and the end of the externally threaded portion 3 of the male member 2, such washer, however, has not been shown since it does not form part of the present invention. The male and female nipples 2 and 5 have been shown in plain form, since the step of corrugating same for gripping the hose thereon with a hose clamp or the like may be taken care of either as a finishing step for the coupling or as a final step during the assembling of the plain nipples on a suitable piece of hose.

In case the hose gripping corrugations are to be formed at the time the coupling is mounted on a piece of hose, the nipples will be left smooth for shipment to and installation by the hose manufacturer. The present invention, to meet that condition, involves the placing of a rib 9 on the female nipple close to but spaced from outturned flange 6 with inturned flange 8 of nut 7 therebetween. Rib 9 may be produced by a rolling operation wherein a mandrel (not shown) of smaller diameter than the inside diameter of nipple 5, will be provided with a small projecting rib at its end so that same may be passed into the female nipple 5 and then by rolling the outer face of the nipple with a suitably grooved roller directly over the rib on the mandrel the outwardly directed rib 9 will be formed. Rolling this rib, it has been found, commonly produces a slight inwardly directed rib 10. The size of rib 10 may be kept relatively small by providing the roller for use on the outside face of the nipple with an elongated flat shoulder rather than a relatively sharp edged groove. With a nipple formed, as shown in Figure 1, it is to be observed that nut 7 is firmly fastened on the female nipple 5 and will not be dislodged thereafter under conditions of shipping or handling, and thus considerable time will be saved in installing the coupling on a piece of hose. Instead of following the common procedure for installing nipples on a piece of hose by inserting the shoulder of a shouldered mandrel (not shown) into the nipple from the large end thereof with the mandrel shoulder resting against flange 6 of the female nipple 5 and then pushing same endwise to bring the end of the hose up against inturned flange 8 of nut 7, the new construction makes possible the complete elimination of the use of a mandrel, since the large end of either half of the coupling free of hose gripping corrugations may be pushed against the edge of the hose mounting bench, or other suitable surface, to force the nipple into the end of the hose. Then when the female half of the coupling is thus forced into the end of the piece of hose, inturned flange 8 of nut 7 will move up against rib 9 and when the hose is fully in place, nut 7 will be loose between the end of the hose and flange 6 of the nipple. The tightening of a hose clamp, or ferrule, on the nipple, or the expanding of the nipple outward with a ferrule on the hose, will slightly force the hose endwise but not enough to seriously bind against flange 8 of nut 7, and thus the nut is kept loose for easy operation.

An alternate procedure for producing the nut holding rib on the female half of the coupling is to form it by upsetting methods. Referring to Figure 3, an apparatus of the type illustrated in diagrammatic manner may be used for forming an upset rib 9a on female nipple 5. Under these conditions the female nipple 5, which, for instance, may be made out of suitable brass or copper tubing, is mounted on a grooved mandrel member 11 which has an extending end member 12 which closely but freely fits the bore of nipple 5. Groove 13 in this mandrel member is of a depth corresponding to the desired length of the nipple blank beyond the upset rib. Female die 14 has a bore extending to a shoulder with the length of such bore corresponding with the desired length of the nipple blank from the upset rib to the other end thereof. This leaves a space 15 between the adjacent ends of grooved mandrel member 11 and female die 14 which corresponds with the length of the portion of nipple 5 which is to be upset in an outward direction. The apparatus as thus assembled with the nipple in place is then forced endwise in a suitable press (not shown) which reduces the length of space 15 between members 11 and 14 and upsets nipple 5 outwardly therebetween to form rib 9a as shown in Figure 4. Members 11 and 14 are then pulled apart and the nipple with its upset rib removed in conventional manner which leaves the apparatus ready for upsetting the next nipple.

Figure 2:
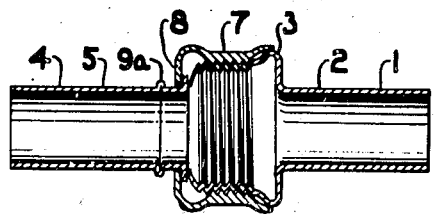
Figure 2 shows a longitudinal section view of a modified form of the present invention.

After the nipple has been formed as shown in Figure 4 the next step involves forming flange 6 thereon. While a round cornered flange may be made in one operation, the making of a sharp cornered flange may be accomplished by first placing nut 7 on the nipple and then by means of a suitable mandrel and a punch with a 45° face, (not shown) the flange may be partially formed as shown in Figure 5, following which a flat faced punch may be used to finish turning the flange at right angles to the axis of the nipple as shown in Figure 2. With this type of construction, nut 7 is anchored in place between flange 6 and upset rib 9a, thus avoiding undesired separation of the parts under conditions of transportation and assembly.

While, for convenience, the invention has been described in connection with a plain nipple particularly adapted for corrugating at the time of installing on a hose member, the invention is not limited to that procedure, since obviously the present invention will not be varied by installing hose gripping corrugations at any suitable time either before or after mounting on a hose member.

Other modes of applying the principle of our invention may be employed instead of those explained, change being made as regards the means and the methods herein disclosed, provided those stated by any of the following claims or their equivalent be employed.

We therefore particularly point out and distinctly claim as our invention:

1. A new article of manufacture in the finished form of the female part of a thin metal type separable hose coupling comprising a nipple and a nut adapted to be anchored in place on the end of a hose section by expansion of the nipple after the nipple has been entered into the end of said hose section, said coupling part having a nut with an inwardly flanged end, said nipple having an outwardly flanged end, the flange of said nut engaging said nipple behind the flange thereof, outwardly extending means on said nipple close to the flange thereof but spaced sufficiently therefrom to provide for free rotation and substantial endwise movement of the flange of said nut therebetween, said means forming an abutment to limit the introduction of the nipple into the hose end and said nipple extending from said outwardly extending means to the free end thereof in substantially straight cylindrical form to facilitate reception in the end of a hose.

2. A new article of manufacture in the finished form of the female part of a thin metal type separable hose coupling comprising a nipple and a nut adapted to be anchored in place on the end of a hose section by expansion of the nipple after the nipple has been entered into the end of said hose section, said coupling part having a nut with an inwardly flanged end, said nipple having an outwardly flanged end, the flange of said nut engaging said nipple behind the flange thereof, an outwardly extending circumferential rib on said nipple close to the flange thereof but spaced sufficiently therefrom to provide for free rotation and substantial endwise movement of the flange of said nut therebetween, said rib forming an abutment to limit the introduction of the nipple into the hose end and said nipple extending from said outwardly extending circumferential rib to the free end thereof in substantially straight cylindrical form to facilitate reception in the end of a hose.

LOID M. STINCHCOMB.
RAYMOND S. DOERR.

REFERENCES CITED

The following references are of record in the file of this patent:

UNITED STATES PATENTS

| Number | Name | Date |
|---|---|---|
| 454,647 | Hallas | June 23, 1891 |
| 683,342 | Sherman | Sept. 24, 1901 |
| 1,928,837 | Loughead | Oct. 3, 1933 |
| 1,936,552 | Goss | Nov. 21, 1933 |